May 3, 1949.    O. E. ANDRUS    2,469,099
ELECTRIC WINDINGS AND LEADS THEREFOR
Filed Jan. 21, 1948    2 Sheets-Sheet 1
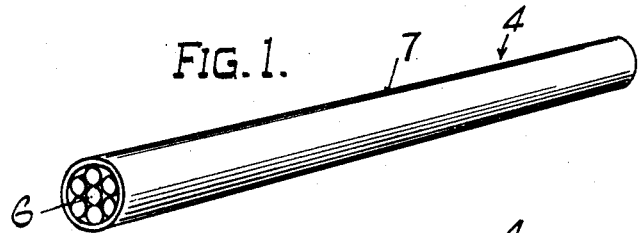
FIG. 1.
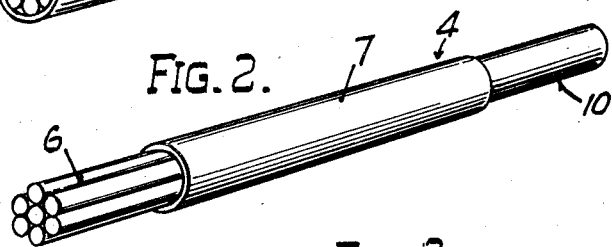
FIG. 2.
FIG. 3.
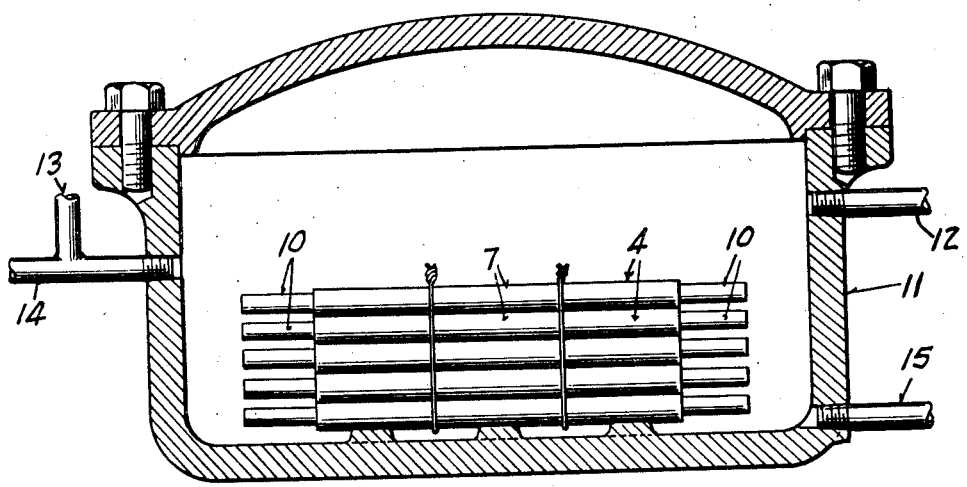
FIG. 4.
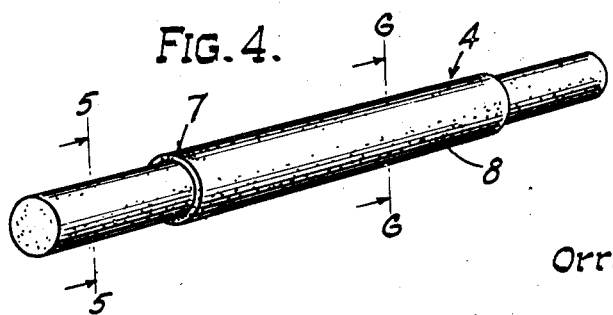
Orrin E. Andrus
INVENTOR.
BY
ATTORNEY.

May 3, 1949. O. E. ANDRUS 2,469,099
ELECTRIC WINDINGS AND LEADS THEREFOR
Filed Jan. 21, 1948 2 Sheets-Sheet 2
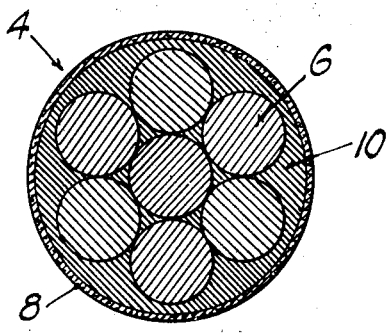
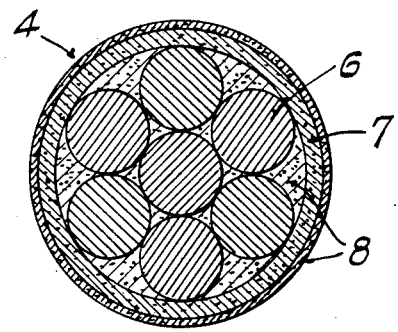
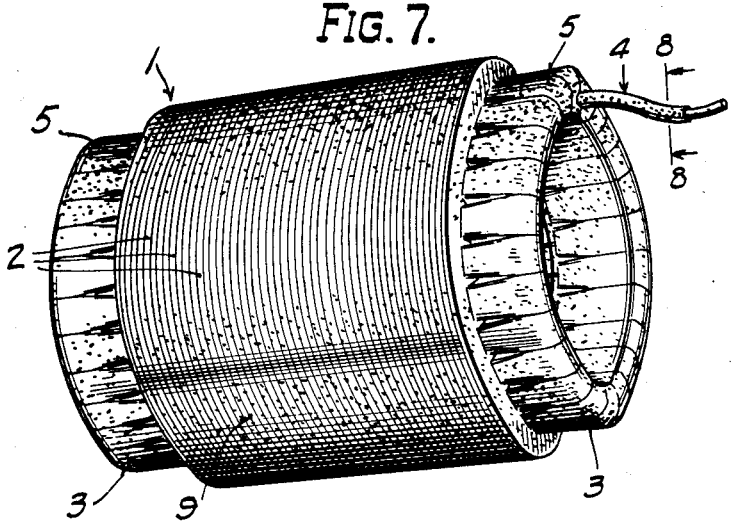
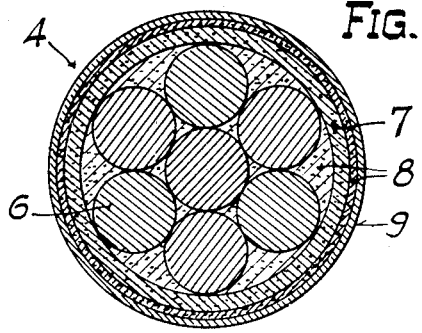
Orrin E. Andrus
INVENTOR
ATTORNEY.

Patented May 3, 1949

2,469,099

UNITED STATES PATENT OFFICE 2,469,099

ELECTRIC WINDINGS AND LEADS THEREFOR

Orrin E. Andrus, Altadena, Calif., assignor to A. O. Smith Corporation, Milwaukee, Wis., a corporation of New York Application January 21, 1948, Serial No. 3,386

7 Claims. (Cl. 171—252)

This invention relates to electric windings and has particular reference to the providing of permanently flexible leads for electric windings such as stator windings for electric motors.

When a low-cost winding is made it is customary to attach lead wires thereto prior to the impregnation of the winding structure with a non-silicone electrical insulating varnish. The baking operation employed to process the non-silicone varnish impregnated winding and lead wire tends to make the lead wires inflexible and readily subject to damage when flexed. The wires are apt to break due to the brittleness throughout the same or to develop electrical leakage due to cracking of the insulating coating.

Although silicone varnishes may be employed to impregnate electric windings and leads so that flexure may occur without injury, these are expensive and are not applied to the complete winding structure where lower cost windings are necessary.

The principal object of the invention is to provide a lead that may be attached to windings prior to the application of a non-silicone varnish, and which will remain flexible following the usual baking operations required to process the non-silicone varnish.

Another object is to provide a method of manufacturing a low-cost winding having permanently flexible leads.

Another object is to provide a covered lead having stranded conductors in which all surfaces of the cover and the conductor strands are coated with silicone varnish in a manner to eliminate voids.

Another object is to provide leads having bare ends in which the strands are metallically bonded prior to impregnation with silicone resin to prevent the resin from coating the individual strands and interfering with electrical contact at the juncture of the lead with the winding.

The invention is predicated on the employment of non-silicone insulating varnishes for the impregnation of windings and attached lead wires where the lead wires have prior to attachment to the windings been impregnated throughout with silicone varnish. It is desirable under the invention that the silicone varnish completely saturate the covering of the lead wires as well as fill in the spaces between the strands of the wires.

The invention is illustrated in the accompanying drawing in which:

Figure 1 is an enlarged perspective view of a lead wire cut to length;

Fig. 2 is an enlarged perspective view of a lead wire with ends bared but with the strands on one end soldered together;

Fig. 3 illustrates lead wires assembled in a bundle preparatory to evacuating and impregnating;

Fig. 4 is an enlarged perspective view of a single lead wire after impregnation with silicone varnish and baking;

Fig. 5 is an enlarged section taken on line 5—5 of Fig. 4;

Fig. 6 is an enlarged section taken on line 6—6 of Fig. 4;

Fig. 7 is a perspective view of a stator with a lead wire attached and after impregnation with non-silicone varnish; and Fig. 8 is an enlarged section taken on line 8—8 of Fig. 7.

Referring to the drawings, there is illustrated a stator 1 comprising a plurality of stacked laminations 2 provided with windings 3 and to the end coils of which are secured lead wires 4.

The end coils of windings 3, suitably insulated from each other, are taped together by tape 5. The stranded wires 6 of lead wires 4 are preferably sheathed in an insulating covering 7 that preferably is of Fiberglas or asbestos.

The insulating covering 7 of lead wires 4 is impregnated with a coating 8 of silicone varnish or resin. The silicone varnish 8 completely penetrates the covering 7 and essentially fills all the spaces between the stranded wires 6 of the lead wires beneath covering 7.

The entire stator including windings 3 and lead wires 4 is covered with non-silicone varnish 9, and the latter forms the outer insulating cover of the stator. Thus covering 9 is disposed on top of the insulating silicone varnish 8 with which the lead wires 4 are impregnated.

In carrying out the invention the lead wire 4 which is illustrated in Fig. 1 as cut to the length desired for application to stator 1, is sheathed in the insulating covering 7 of Fiberglas or asbestos. In the event that waxes are present in covering 7 the same may be treated with chlorinated hydrocarbon, such as trichlorethylene to remove the waxes and more readily permit the silicone varnish 8, that is later applied, to penetrate the coating.

The ends of the lead 4 are next bared, as shown in Fig. 2, to expose the strands 6. After baring of the strands 6 at the ends of lead 4, the strands are mechanically bonded together by solder 10 or the like, as shown at one end in Fig. 2. This prevents the silicone varnish 8 from getting between the individual strands 6 at the bared ends of lead 4 when the varnish is applied in the next operation.

The silicone varnish coating 8 is next applied to the lead wire 4. This application may be accomplished in several different ways. It is preferable, however, to follow the procedure described in the copending application of the present inventor entitled Method of insulating electric windings, Serial No. 3,389.

The method there described is applicable to a procedure where a plurality of separate wires 4 or a bundle of wires 4 are placed in an impregnator and subjected to a high vacuum to withdraw air and moisture from the pores of the insulating material 7. The silicone varnish is then introduced into the evacuated impregnator and subjected to a high pressure to force the same into all capillaries and pores of insulating material 7 and between stranded wire 6 and the insulating material. By thoroughly impregnating the lead wire 4 with silicone varnish, subsequent impregnations with ordinary varnishes will not result in direct contact thereof with the stranded wire 6 and the fiber surfaces of insulating material 7.

After impregnation the wire is baked at about 500° F. to set the resin varnish.

Ordinarily the covering 7 of lead wire 4 will be composed of Fiberglas or asbestos that is able to withstand the high temperatures required to polymerize the silicone varnish.

Should it be desirable to employ cheaper insulation on the leads such as cotton, which is unable to withstand high temperatures, good results have been obtained by baking the silicone varnish at temperatures such as 300° F. With the usual asbestos or Fiberglas covered wire the preferred baking temperature approximates 500° F.

Where the wires are in bundles they should be separated before complete polymerization and ordinarily before a temperature of 300° F. is exceeded.

The time required to accomplish complete impregnation and baking depends on whether the wires are baked individually or in a bundle and will vary with the thickness of insulating covering 8 and the dimensions of the bundle if the wires are handled in bundles.

Fig. 3 illustrates a plurality of individual stranded lead wires 4 with their ends bared and soldered, assembled in a bundle and disposed in impregnator 11 preparatory to extraction of moisture and air, and impregnation and baking. The impregnator is evacuated through pipe 12, and the varnish is supplied through pipe 13. Pressure is applied through pipe 14 and the varnish is drained from the impregnator 11 through pipe 15. After impregnation a bundle of lead wires 4, for example, can first be baked at about 300° F. under a high vacuum, as described in the application of the present inventor above referred to, to remove varnish solvents.

The wires are preferably then removed from the bundle before the high-pressure, high-temperature bake that ordinarily follows, otherwise the final separation of the leads from the bundle may be difficult. After removal from the bundle excess silicone varnish 8 may be removed from the lead wires by drawing the same through a die or between formed rollers, not shown. The final high-temperature, high-pressure bake can be carried out by placing lead 4 in a pressure bake oven, not shown. However, a high temperature bake at atmospheric pressure can also be used.

The silicone resin film on the soldered bared ends of lead 4 is next removed and the leads are then suitably secured to windings 3 of the stator 1.

The stator 1 with leads 4 attached to the end coil of windings 3 is next placed in an impregnator and evacuated, after which the stator including the windings and leads is completely covered with the non-silicone varnish covering 9. This may be accomplished by submergence of the stator 1 in varnish 9 and subjecting the same to the usual procedures of pressure impregnating and baking to set and harden the varnish 9 into a protective insulating coating.

The leads 4 remain flexible since the silicone varnish 8 underneath non-silicone varnish 9 can withstand substantial flexure without injury. The outer varnish 9 may become brittle and break off without injury to the silicone varnish 8.

In carrying out the invention it is desirable that the silicone varnish 8 penetrate all the pores of covering 7 as well as essentially fill all the spaces between stranded wires 6 beneath the covering. This will insure that when varnish 9 is applied it will not penetrate into the insulation 7 and onto wire 6 causing resultant brittleness of the lead and electrical failure.

The invention provides lead wires that remain permanently flexible in service. The method employed to obtain this condition permits use of low-cost insulation and the ordinary varnish on stators or the like, with which the invention is employed.

Various embodiments of the invention may be employed within the scope of the accompanying claims.

I claim:

1. Leads for non-silicone varnish impregnated electric windings, said leads comprising wire surrounded by insulating material impregnated with silicone varnish to render the leads substantially permanently flexible in service without deterioration, and a coating of non-silicone varnish provided as the outer covering for both said windings and the silicone impregnated leads.

2. Leads for non-silicone varnish impregnated electric windings, said leads comprising wire strands surrounded by insulating material impregnated with silicone varnish and with the spaces between said strands being filled with silicone varnish to render the leads permanently flexible in service without deterioration, and a coating of non-silicone varnish provided as the outer covering for both said windings and the silicone impregnated leads.

3. A stator or the like comprising a stator core, a winding for said core, stranded leads secured to said winding, a silicone resin coating said leads and filling the spaces between the strands of the individual leads, and a non-silicone insulating varnish impregnated in said stator and coating the winding and the silicone covered leads.

4. The method of providing permenently flexible, fiber-insulated leads for non-silicone varnish impregnated electric windings which comprises impregnating the fiber-insulated leads with silicone varnish, and thereafter covering both said windings and silicone-impregnated leads with a coating of non-silicone varnish.

5. The method of providing a permanently flexible, fiber-insulated, stranded lead for non-silicone varnish impregnated electric windings which comprises impregnating the lead with silicone varnish to completely penetrate the pores of the insulation and substantially fill all the voids between the lead strands, and thereafter covering both said windings and silicone-impregnated leads with a coating of non-silicone varnish.

6. The method of providing a permanently flexible, fiber-insulated, stranded lead for non-silicone varnish impregnated electric windings, which comprises baring the ends of a lead cut to length and soldering the strands at each of the bared ends together, impregnating the lead with silicone varnish to completely penetrate the insulation and fill substantially all the spaces between the lead strands, and thereafter attaching the leads to the windings and covering both said windings and silicone impregnated leads with a coating of non-silicone varnish.

7. The method of providing permanently flexible, fiber-insulated, stranded leads for non-silicone varnish impregnated electric windings, which comprises baring the ends of each lead cut to length and soldering the strands at the bared ends of each lead together, assembling a plurality of leads in a bundle and impregnating the leads with silicone varnish to completely penetrate the insulation and substantially fill all the spaces between the lead strands, removing the leads from said bundle and securing the required number to the windings, and thereafter covering both said windings and silicone-impregnated leads with a coating of non-silicone varnish.

ORRIN E. ANDRUS.

No references cited.